United States Patent
Donovan (10) Patent No.: US 6,806,902 B1
(45) Date of Patent: Oct. 19, 2004

(54) SYSTEM AND METHOD FOR CORRECTING BAD PIXEL DATA IN A DIGITAL CAMERA

(75) Inventor: Timothy J. Donovan, Milpitas, CA (US)

(73) Assignee: Chrontel, Inc., San Jose, CA (US)

(*) Notice: Subject to any disclaimer, the term of this patent is extended or adjusted under 35 U.S.C. 154(b) by 0 days.

(21) Appl. No.: 09/328,873

(22) Filed: Jun. 8, 1999

(51) Int. Cl.[7] .................................................. H04N 9/64
(52) U.S. Cl. ........................................ 348/246; 348/272
(58) Field of Search ................................. 348/246, 241, 348/247, 272; 382/272, 274, 275, 149, 254, 205; 358/448, 447, 461

(56) References Cited

U.S. PATENT DOCUMENTS

| | | | | |
|---|---|---|---|---|
| 4,602,291 A | * | 7/1986 | Temes ......................... | 348/243 |
| 5,086,343 A | * | 2/1992 | Cook et al. ................. | 348/247 |
| 5,327,246 A | * | 7/1994 | Suzuki ....................... | 348/246 |
| 5,805,216 A | * | 9/1998 | Tabei et al. ................. | 348/246 |
| 6,002,433 A | * | 12/1999 | Watanabe et al. ........... | 348/246 |
| 6,028,628 A | * | 2/2000 | Van Der Valk ............. | 348/246 |
| 6,104,839 A | * | 8/2000 | Cok et al. ................... | 382/254 |
| 6,381,357 B1 | * | 4/2002 | Tan et al. .................... | 382/141 |
| 6,509,927 B1 | * | 1/2003 | Prater et al. ................. | 348/246 |
| 6,529,238 B1 | * | 3/2003 | Mahant-Shetti et al. .... | 348/246 |
| 6,529,622 B1 | * | 3/2003 | Pourjavid .................... | 348/246 |

OTHER PUBLICATIONS

Dierickx et al., "Missing pixel correction algorithm for image sensors", paper produced by IMEC, submitted for Europto–SPIE/AFPAEC, May 18–21, 1998, Zurich, Switzerland.

\* cited by examiner

Primary Examiner—Aung Moe
(74) Attorney, Agent, or Firm—Dorsey & Whitney LLP (57) ABSTRACT

A bad pixel detection and correction system and method in which two estimates are computed in real time for the value of a given pixel. The two estimates are based on the values of pixels surrounding the given pixel. One of the estimates is a minimum value and the other of the two estimates is a maximum value. When the value of the given pixel exceeds the maximum value, the given pixel value is reset to the maximum value. When the value of the given pixel is less than the minimum value, the given pixel value is reset to the minimum value. Otherwise, the given pixel value is not changed. The given pixel value after updating is injected in real time into the stream of pixel data provided for additional graphics processing, such as RGB interpolation. This prevents bad pixel data from affecting the values of other pixels computed in the additional graphics processing. The bad pixel detection and correction system can operate with both monochrome and color pixel data.

18 Claims, 11 Drawing Sheets

(2 of 11 Drawing Sheet(s) Filed in Color)

EVEN ROW, EVEN COLUMN CONDITION

OUTPUT DATA SEQUENCE

FIG. 1
OUTPUT DATA FORMAT

FIG. 2
'BAYER' COLOR FILTER PATTERN

FIG. 3
INTERPOLATION OF RGB VALUES

FIG. 4
EVEN ROW, EVEN COLUMN CONDITION

FIG. 5
EVEN ROW, ODD COLUMN CONDITION

FIG. 6
ODD ROW, EVEN COLUMN CONDITION

FIG. 7
ODD ROW, ODD COLUMN CONDITION

FIG. 8
BLOCK DIAGRAM

FIG. 9
BAD PIXEL DETECTION AND REMOVAL DIAGRAM

FIG. 10A
VALID PIXELS MODIFIED

FIG. 10B
VALID PIXELS UNMODIFIED

FIG. 11A
MONOCHROME SENSOR W/O CORRECTION

FIG. 11B
MONOCHROME SENSOR W/CORRECTION

Figure 12A: Color Sensor w/o Correction

Figure 12B: Color Sensor w Correction

Figure 12C: Color Sensor w Correction (corrected pixels shown)

SYSTEM AND METHOD FOR CORRECTING BAD PIXEL DATA IN A DIGITAL CAMERA

The present invention relates generally to digital photography and particularly to correcting bad pixel data in a digital camera.

BACKGROUND OF THE INVENTION

One of the significant factors affecting the performance and yield of color image sensor devices is bad pixels. These are considered to be individual pixels locations that, due to a processing defect, produce an output signal that is either higher or lower than neighboring pixels when exposed to a similar light source. This defect can be in the form of an excess leakage current adding or subtracting from the photo generated current, or a short or open circuit located within the photocell. CMOS image sensors are particularly susceptible to these failures due to their relatively high amount of circuitry per photocell. It is desirable to have a method to detect and remove these bad pixels when the light level is such that the defect becomes noticeable.

Figure 1:
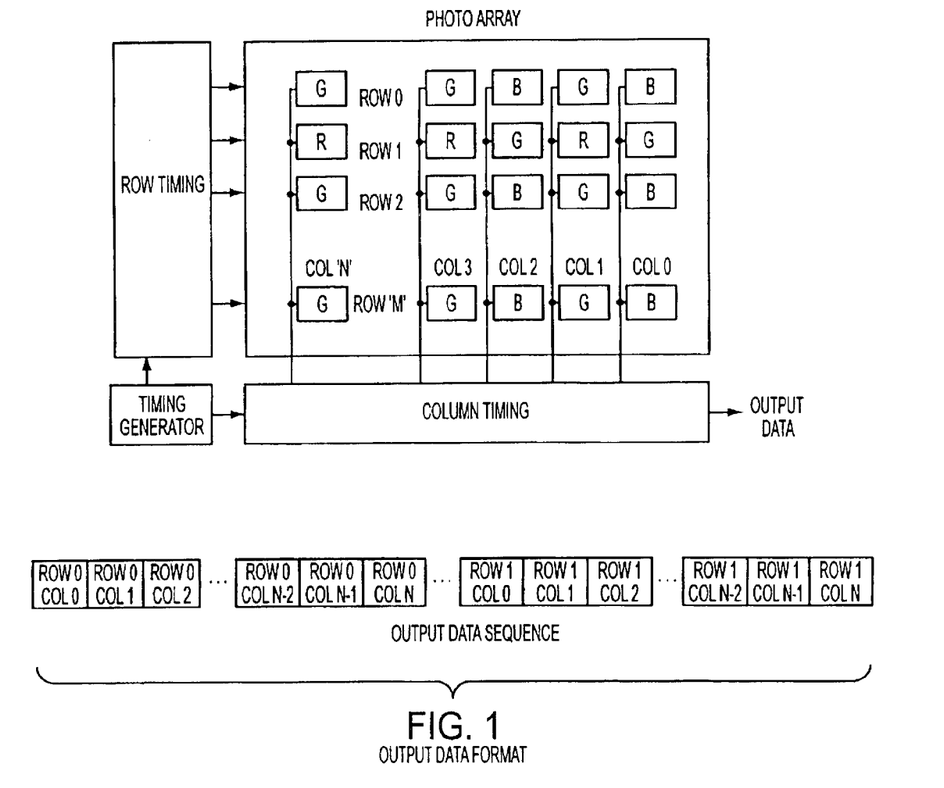
FIG. 1 is a diagram of a photo array and an output data sequence of data output from the photo array.
Figure 2:
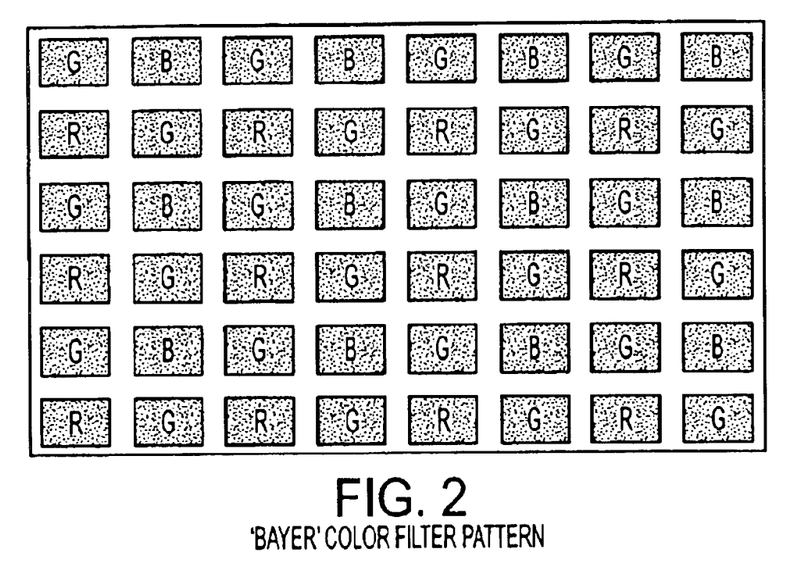
FIG. 2 is a diagram of a 'Bayer' color filter pattern that characterizes the color response characteristics of a color photo array.

Before describing prior art and the invention, the steps used to create a color image from a single color image sensor are briefly described. In a monochrome sensor, an array of photocells is exposed to light for a period of time and the state of the individual photocells is then serially output through readout circuitry. This type of readout circuitry can vary depending upon the technology being used (CMOS versus CCD), but the result is the same, a stream of data corresponding to the light landing on the first column and first row, followed by the light hitting the second column and first row, continuing until the first row has been completely read out. At this point, the second row is read out, first column followed by second column until all columns have been read out. This continues until the entire array has been read out. This sequences the data in a format compatible with the way most display devices accept their input. FIG. 1 shows a diagram of a typical system used in a CMOS image sensor to achieve this. The size of the array is arbitrary to this algorithm. In a single color image sensor, each of the photocells is covered with a color filter material that passes light of different wavelengths. Frequently, for progressively scanned image sensors, three types of filter material are chosen to be red (R), green (G) and blue (B), and are arranged in a 'Bayer' pattern as shown in FIG. 2. In this case, when a given row of the array is read, the output alternates between photocells responsive to two different spectrums of light. For every other row, the output alternates between the blue and green spectrums, and during the opposite rows alternates between the green and red spectrums. After readout it is necessary to form a complete RGB value for each pixel of the array. This is typically performed by storing one or more lines of data from the photo array, and interpolating from the surrounding pixels a complete RGB value for each pixel. One method to perform this function is shown in FIG. 3.

Figure 3:
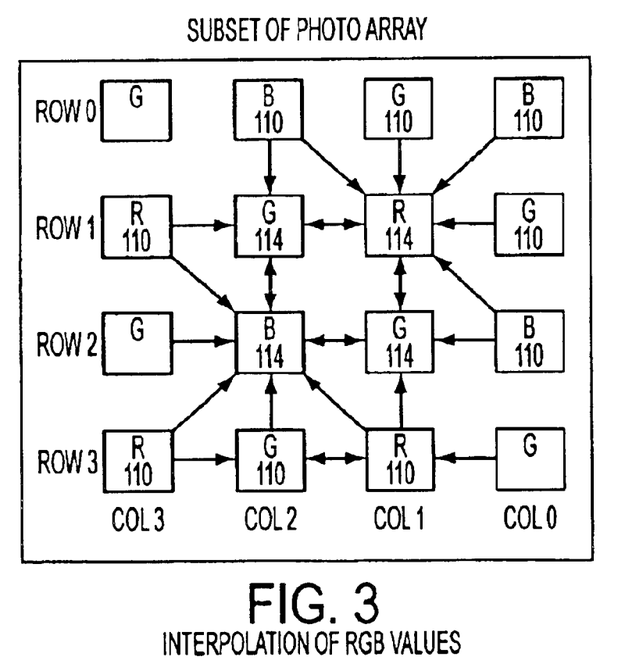
FIG. 3 is a diagram of a subset of a photo array showing how color values for a given pixel are interpolated from color values of neighboring pixels.

FIG. 3 shows the potential pixel values 110 that can be used to form the complete RGB value for the four pixels 114 at locations Col (column) 1 and 2, Row 1 and 2. As can be seen from this figure, a single pixel error will corrupt multiple pixels if not corrected prior to the RGB interpolation for each pixel.

It has previously been shown (B. Dierickx, G. Meynants, "Missing pixels correction algorithm for image sensors," AFPAEC Europto/SPIE, Zurich, 18–21 May 1998; proc. SPIE vol. 3410, pp. 200–203, 1998. http://www.imec.be/bo/publications/wpc98.ps.) that it is possible to detect and correct bad pixels in a monochrome sensor based on an evaluation of the surrounding pixel elements. This method is based on establishing an upper and lower bound on an acceptable value of a given pixel and limiting the pixel's value to that range. However, the proposed method by Dierickx and Meynants for dealing with color image sensors was impractical for two reasons. First, they proposed that the correction be performed on the reconstructed RGB (or YUV) signals, provided that the reconstruction results in single pixel defects when the original defect was single pixel in nature. This, however, is not the case for most reconstruction algorithms in use today. As is shown in FIG. 3, a single pixel defect will affect more than one pixel in the output video. Second, the technique would need to be performed on three components if implemented in the reconstructed RGB (or YUV) domain, increasing the circuitry required three-fold.

Therefore, there is a need for a system that detects and corrects bad pixels in a color sensor without the additional circuitry that is required by Direickx and Meynants' method.

SUMMARY

In summary, the present invention is a system and method for detecting and correcting bad pixel data from a digital color sensor. Embodiments of the present invention are configured to develop two estimates for the value of a given pixel based on the values of surrounding pixels. One estimate is used to limit the maximum value that a given pixel is allowed to take and the other estimate is used to limit the minimum value that a given pixel is allowed to take. These values are used to detect bad pixels (pixels whose value is not between the minimum and maximum values) and to correct the bad pixels (by setting the value of the bad pixel based on the minimum and maximum values).

One embodiment of the present invention includes memory and computing circuitry. The memory includes four line memories to store four rows worth of graphics data read out of a photocell array and a set of pixel delay elements, each storing a pixel datum used to test and correct a pixel under test. For a given pixel under test, the computing circuitry uses only the values output from the pixel delay elements to determine the minimum and maximum limits for that pixel. In one embodiment, the values output by the pixel delay elements and used by the computing circuitry define a 5 pixel ×5 pixel plus symbol (+) centered at the pixel under test.

In one embodiment, the computing circuitry determines the minimum and maximum limits for a given pixel under test by first determining the derivatives of the pixels above and below and to the left and right of the given pixel. The computing circuitry then computes two vertical and two horizontal estimates for the pixel under test by respectively subtracting and adding the derivatives from/to the values of the nearest photocells that are responsive to the same color of light as the pixel under test. The computing circuitry then sets the minimum limit for the pixel under test to the smallest of the four estimates and the maximum limit to the largest of the four estimates. Alternatively, to prevent the erroneous correction of good pixel data, the computing circuitry considers, in addition to the four estimates, pixel data of the same color as the pixel under test when setting the Max and Min limits. If the value of the pixel under test is less then the minimum limit, the computing circuitry resets it to the minimum limit. If the value of the pixel under test is greater than the maximum limit, the computing circuitry resets it to the maximum limit. The corrected pixel is then written back to the appropriate line memory so that subsequent computations using that pixel will not be affected by bad pixel data.

In yet another embodiment, the computing circuitry determines the correct value for the given pixel by interpolating the minimum and maximum limits. This form of correcting bad pixels, which does not require low pass filtering techniques, maintains good image detail.

The present invention is equally applicable to monochrome or color pixel data.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Additional objects and features of the invention will be more readily apparent from the following detailed description and appended claims when taken in conjunction with the drawings, in which:

DETAILED DESCRIPTION

Systems and methods implemented in accordance with the present invention avoid the above-described problems of prior art systems by performing the detection and removal of bad pixels prior to the reconstruction of the RGB component for each pixel. The method is similar to that described by Dierichx and Meynants, but is extended to the case of photo arrays covered with color filters in a 'Bayer' pattern. Embodiments of the present invention make use of the current row of pixel data being output by the readout circuitry and four previous rows of data, which are stored in memory, to detect and correct bad pixels. Since the type of color filter material placed over a given photocell alternates with each column and each row, there are four possible combinations of the data being held in memory, as shown in FIGS. 4 through 7.

Figure 4:
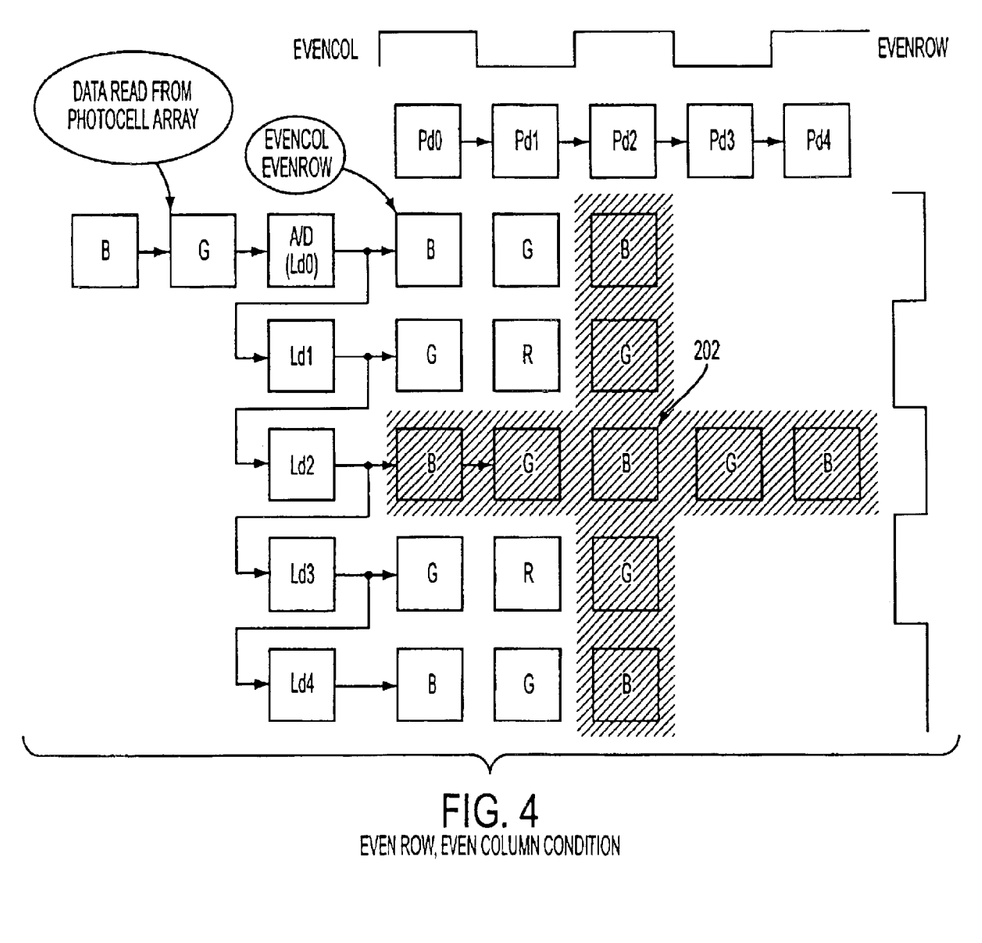
FIG. 4 depicts one embodiment for performing missing pixel detection and correction for a group of pixels from an even-numbered row and an even-numbered column.
Figure 5:
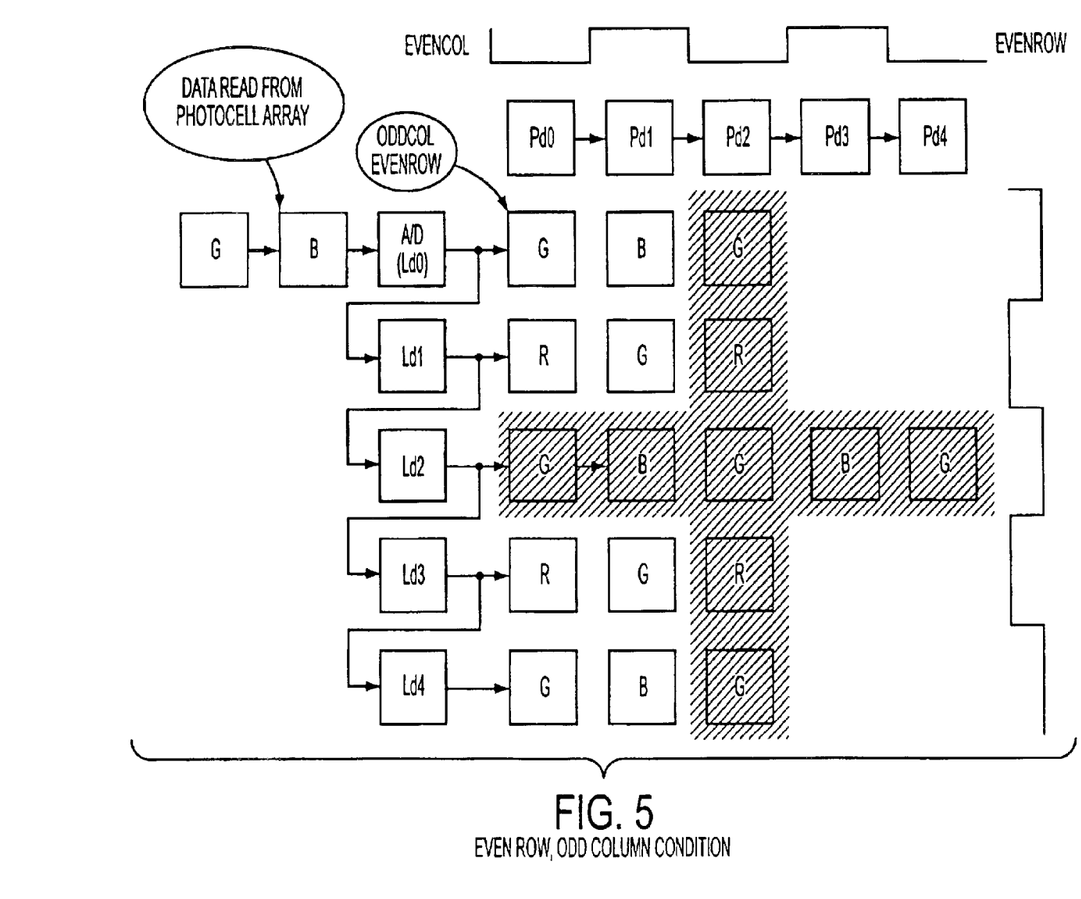
FIG. 5 depicts one embodiment for performing missing pixel detection and correction for a group of pixels from an even-numbered row and an odd-numbered column.
Figure 6:
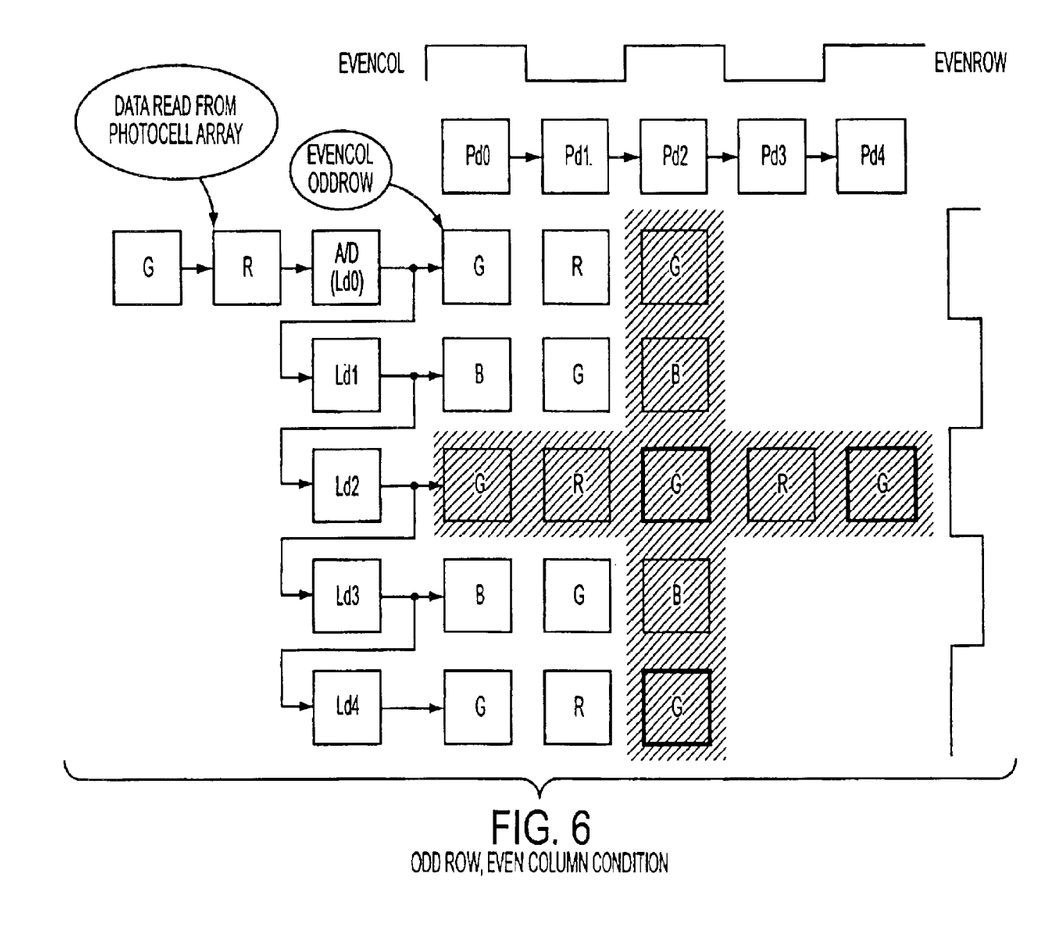
FIG. 6 depicts one embodiment for performing missing pixel detection and correction for a group of pixels from an odd-numbered row and an even-numbered column.
Figure 7:
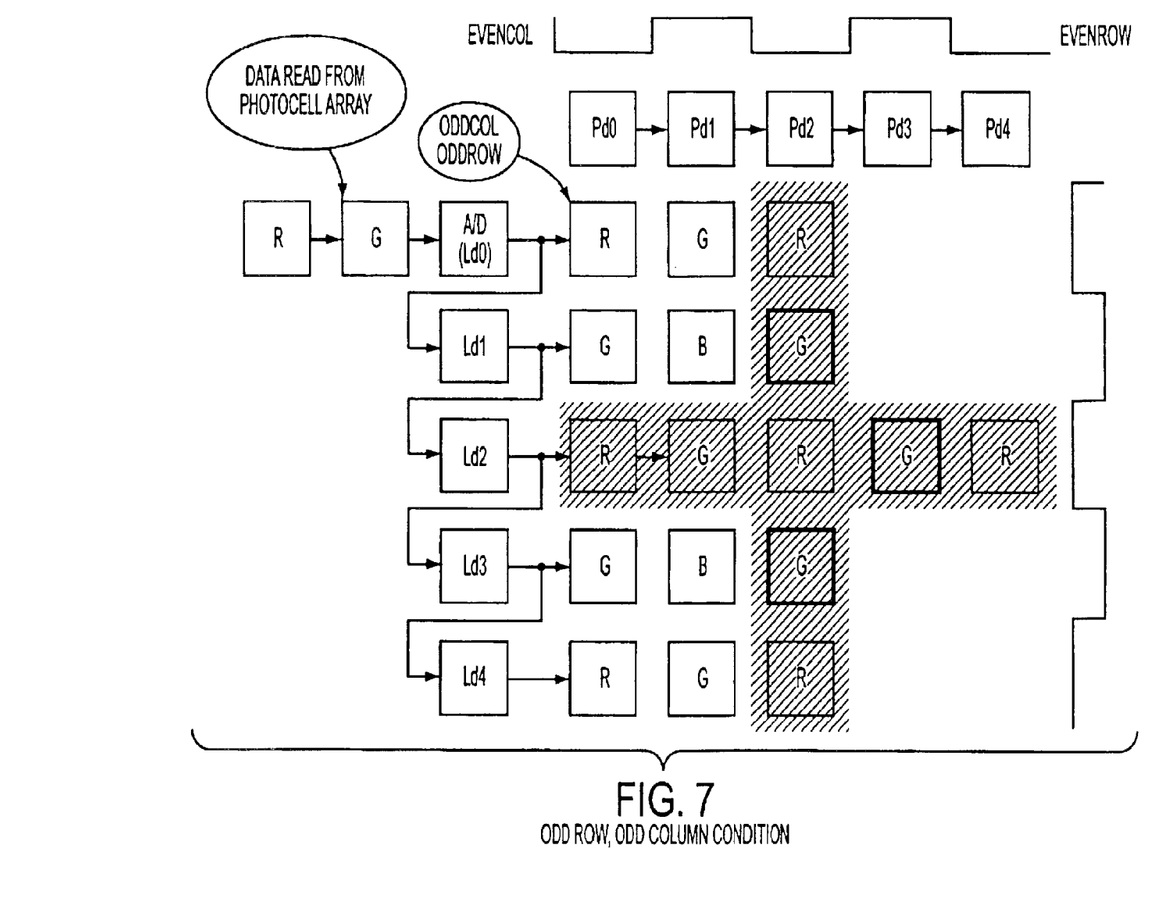
FIG. 7 depicts one embodiment for performing missing pixel detection and correction for a group of pixels from an odd-numbered row and an odd-numbered column.

Referring to FIG. 4, there is depicted a generic embodiment for performing missing pixel detection and correction for a group pixels from an even row and an even column. FIGS. 5–7 show similar embodiments for performing missing pixel detection and correction for a group of pixels from, respectively: an even row and an odd column; an odd row and an even column; and an odd row and an odd column. As each of FIGS. 4–7 are based on similar generic hardware, only the embodiment of FIG. 4 is described herein. The operation of the system shown in FIG. 4 is based on the state of two control signals, EvenRow and EvenCol, which together indicate the four possible row and column combinations of pixel data. In particular, EvenRow is high when pixel data from an even row is under test and EvenCol is high when pixel data from an even column is under test. Because data is read out of the photo array row by row, EvenRow transitions occur at the horizontal frequency of the photo array and EvenCol transitions occur at the pixel frequency of the photo array. The EvenRow and EvenCol signals shown in FIG. 4 are associated with the situation where the pixel data under test is from an even row and an even column which, given the Bayer pattern shown in FIG. 2, is always a "B" pixel (e.g., the "B" pixel 202). Note that these control signals are merely exemplary; other arrangements apparent to skilled practitioners could also be employed to indicate the four combinations of pixel data.

The generic circuit elements shown in FIG. 4 include an analog to digital converter A/D, line delay elements Ld1, Ld2, Ld3, Ld4 and pixel delay elements Pd0, Pd1, Pd2, Pd3, Pd4. The A/D converter converts each analog pixel value from the photo array to a digital value of a selected number of bits (e.g., 5, 8 or 10). Each Line delay element Ld stores one line of digital pixel data and outputs one datum per EvenCol signal transition. The line delays Ld are interconnected so that each datum read out of a line delay element Ld1, Ld2 or Ld3 is respectively written to the same column position of a line delay element Ld2, Ld3 or Ld4. Because each line delay element Ld stores a line of pixel data, each datum newly read out by the A/D converter is delayed one full line (i.e., one half-period of the EvenRow signal) before being read out of the line delay Ld1 and is delayed a corresponding number of lines before being subsequently read out of the line delay elements Ld2, Ld3, Ld4.

The pixel delay elements Pd store pixel data read out of the line delay elements Ld1, Ld2, Ld3, Ld4 and the A/D converter that is needed to test and correct a given pixel. Each pixel delay element Pd outputs a stored datum for each transition of the EvenCol signal. The pixel delay elements Pd are serially interconnected to provide up to a total delay of 5 pixel periods (i.e., to retain a pixel datum up to 2.5 EvenCol cycles after the datum was read out of a line delay element Ld because one complete EvenCol cycle is two pixels in duration). The fact that FIG. 4 shows five pixel delays Pd0–Pd4 does not mean that each datum read out from the A/D converter or the line delays Ld is delayed by 5 pixel periods. Rather, the pixel delays Pd0–Pd4 correspond to the maximum delay needed for pixel datums output from the middle line delay element Ld2. How the present invention makes use of these generic elements is described in greater detail with reference to FIG. 8.

It should be noted that having the output of the A/D converter a blue cell for even row and even column, a red cell for odd row and odd column, and green otherwise is an arbitrary choice. The only critical requirement is that the pattern of red, green and blue follows the 'Bayer' pattern. It will be shown that the present invention operates in the same manner independent of EvenRow and EvenCol, and also performs well in the absence of color filters altogether. This is useful because the same device may be used both with and without color filters to generate two products, a color image sensor and a monochrome image sensor.

The essence of the present invention is to develop two estimates for a given pixel, based on the surrounding pixels. One estimate will be used to limit the maximum value that a given pixel is allowed to take on, and the other estimate is used to limit the minimum value that a given pixel is allowed to take. In FIGS. 4 through 7, the pixels used by the present invention are highlighted with dashed lines. The center of these pixels (referred to as Ld2Pd2 for line delay 2, pixel delay 2) is the pixel that is being tested to determine whether its value is valid, or whether the value should be limited. The limit values are generated by forming the derivative of the pixels to the left and right of the pixel under test (Ld2Pd1 and Ld2Pd3), and above and below the pixel under test (Ld1Pd2 and Ld3Pd2). These derivatives are then added or subtracted from the photocell values two pixels away from Ld2Pd2 to form an estimate of the value for Ld2Pd2. The minimum and maximum of these estimates are then used to limit the value of Ld2Pd2. As FIGS. 4 through 7 show, Ld2Pd1 and Ld2Pd3 always represent the same wavelength of light, although this is a different wavelength than Ld2Pd2. The same is true of Ld1Pd2 and Ld3Pd2. Therefore, the derivatives formed yield a valid estimate of the expected change across two pixels, due to the incoming light source. This change can then be added to or subtracted from a photocell which has been covered by the correct type of color filter, and is located two pixels away from the pixel under test. As FIGS. 4 through 7 also show, the photocells which are two pixels above, below, left or right (Ld1Pd2, Ld4Pd2, Ld2Pd0, Ld2Pd4) of the pixel under test always have the same color filter applied to them as the Ld2Pd2 pixel, and represents the same wavelength of light as the pixel under test. Therefore, these pixel can be used as the basis onto which to add or subtract the derivative signal to estimate the Ld2Pd2 value. An embodiment of the present invention is now described with reference to FIG. 8.

Figure 8:
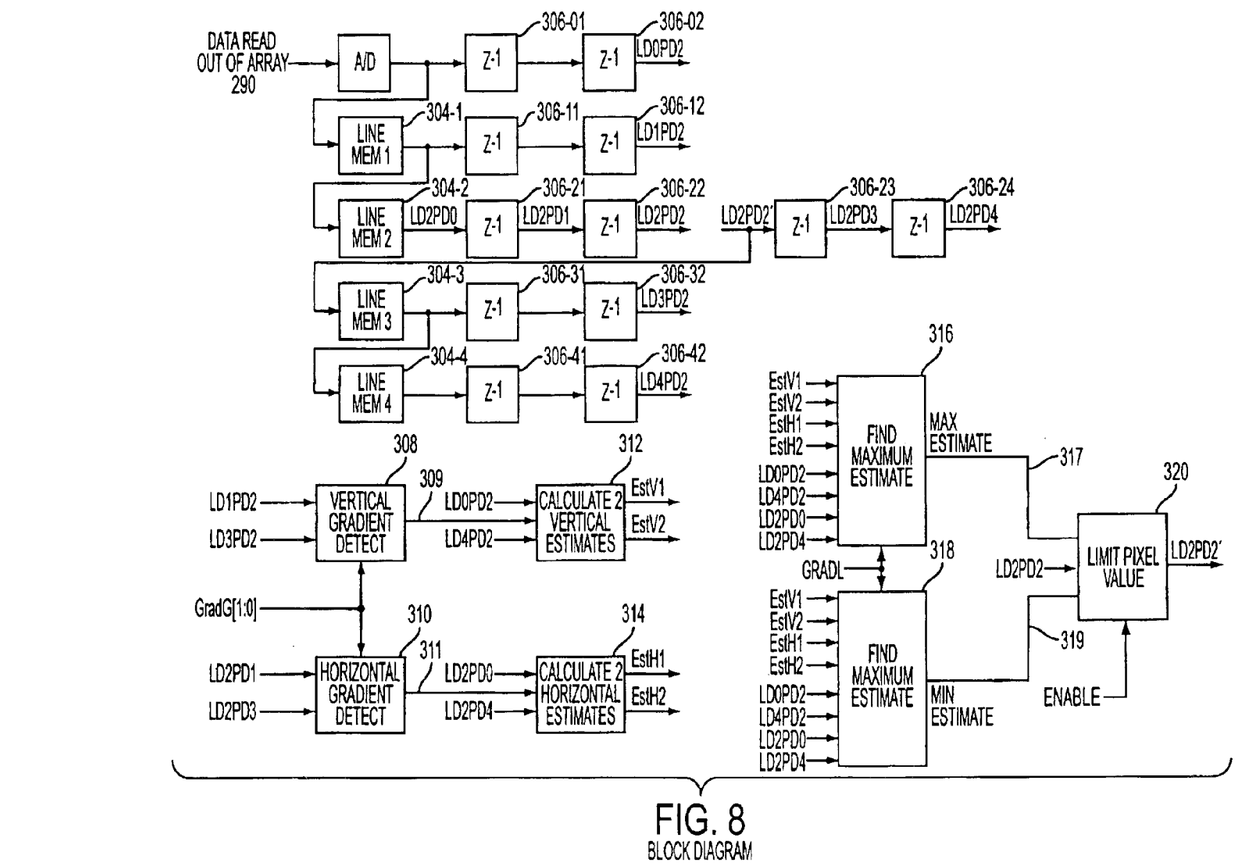
FIG. 8 is a block diagram of a circuit diagram of one embodiment for performing missing pixel detection and correction for a group of pixels.

Referring to FIG. 8, there is shown a block diagram of an embodiment for implementing the above-described method that includes an A/D converter, four line memories 304 (corresponding to the line delays Ld of FIGS. 4–7), twelve z-delay/memory elements ($z^{-1}$) 306 (corresponding to the pixel delays Pd of FIGS. 4–7), vertical and horizontal gradient detect blocks 308, 310, vertical and horizontal estimate blocks 312, 314, Max and Min estimate blocks 316, 318 and a pixel limit block 320. The data read 290 out of the photo array (FIG. 1) is input to the A/D converter and the output of the A/D converter is coupled to a line memory 304-1 and a z-delay 306-01. The line memories 304 are interconnected as described with reference to FIG. 4, except the output of the line memory 304-2 is not coupled to the input of the line memory 304-3, which is instead coupled to a corrected version of the pixel under test Ld2Pd2. The output of each line memory 304-$i$ (where "i" is an integer index) is coupled to a respective z delay 306-$i$1. The output of each z-delay 306-$i$1 is in turn connected to another z-delay 306-$i$2. For example, the input and output of the z-delay 306-11 are respectively coupled to the line memory 304-1 and the z-delay 306-12. The outputs of a subset of the z-delays 306 are labeled in accordance with the line and pixel indices shown in FIGS. 4–7. For example, the output Ld2Pd2 of the z-delay 306-22 corresponds to the pixel under test.

The Ld1Pd2 and Ld3Pd2 delayed outputs (i.e., those just above and below the pixel Ld2Pd2 under test) are input to the Vertical Gradient Detect block 308, which computes the gradient 309 between those two values. The Ld2Pd1 and Ld2Pd3 delayed outputs (i.e., those just to the left and right of the pixel Ld2Pd2 under test) are input to the Horizontal Gradient Detect block 310, which computes the gradient 311 between those two values. The vertical gradient 309 and the Ld0Pd2 and Ld4Pd2 delayed outputs are input to the block 312, which computes 2 vertical estimates EstV1, EstV2 for the Ld2Ld2 pixel. The horizontal gradient 311 and the Ld2Pd0 and Ld2Pd4 delayed outputs are input to the block 314, which computes 2 horizontal estimates EstH1, EstH2 for the Ld2Pd2 pixel. As described above, the estimates are computed by adding or subtracting the gradients from the pixels two pixels away from the pixel Ld2Pd2 under test. The estimates EstV1, EstV2, EstH1, EstH2 and delayed outputs Ld0Pd2, Ld4Pd2, Ld2Pd0, Ld2Pd4 are coupled to the circuits 316 and 318, which respectively compute maximum and minimum estimates 317, 319 for the pixel under test (the Ld2Pd2 pixel). In one embodiment, the maximum and minimum estimates 317, 319 are simply the largest and smallest of the eight input values. Other methods of determining the maximum and minimum estimates can also be implemented in the circuits 316, 318. The maximum and minimum estimates 317, 319 are input along with the Ld2Pd2 datum to the block 320, which limits the value of the Ld2Pd2 datum when it is outside the range defined by the two estimates 317, 319. The output of the circuit 320, which is designated Ld2Pd2', indicating that it could be a corrected version of the pixel under test Ld2Pd2, is fed back to the line memory 304-3. Thus, the pixel datums Ld3Pd2, Ld4Pd2 used to test and correct pixels are themselves corrected data.

Figure 9:
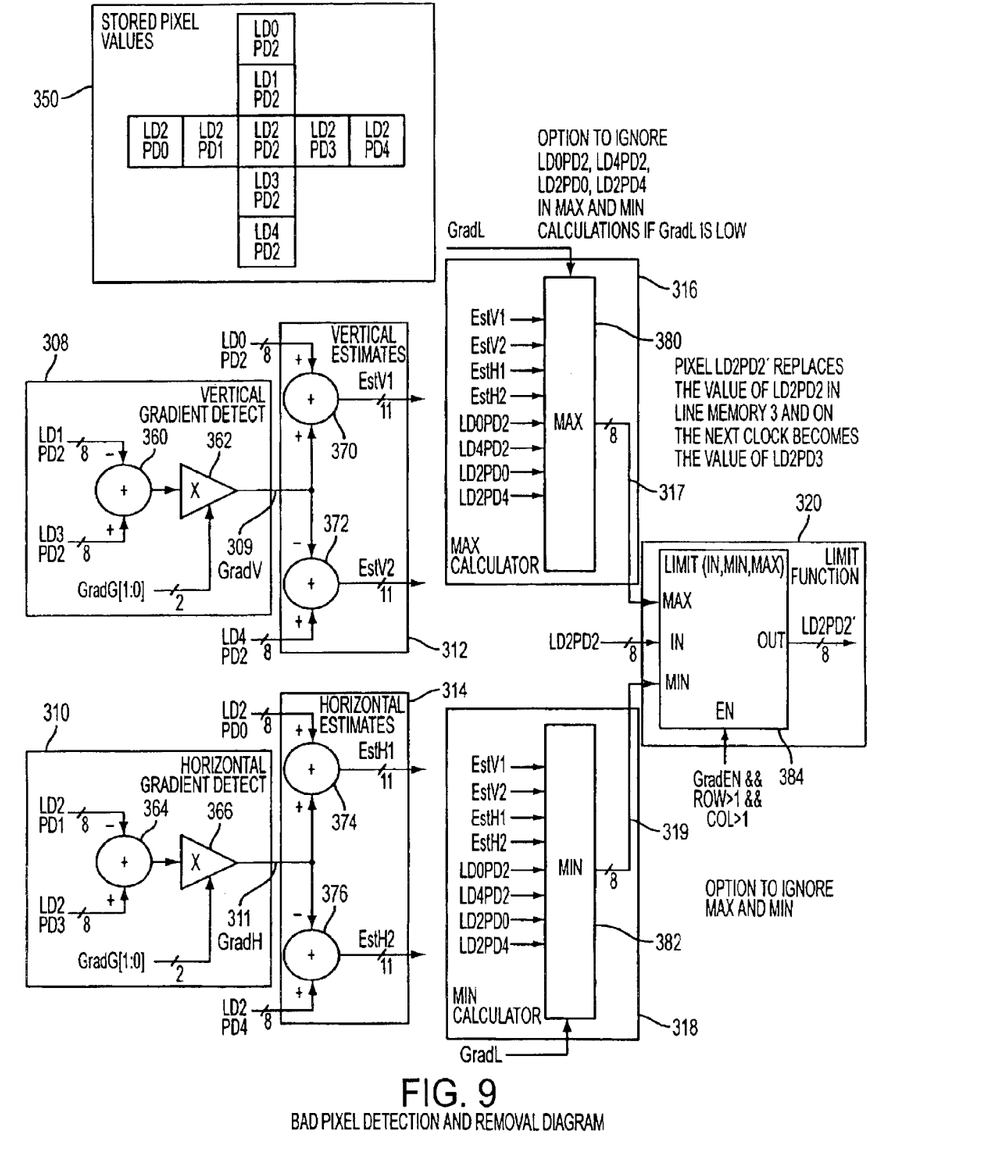
FIG. 9 is a circuit diagram of one embodiment for performing missing pixel detection and correction for a group of pixels.

A detailed diagram of the embodiment of FIG. 8 is shown in FIG. 9. This embodiment implements using conventional circuit elements the method of the present invention. The stored pixels 350 shown at the top left of FIG. 9 are the same pixels output from the z-delay elements 306 of FIG. 8. The circuits 308, 310 respectively include two-input adders 360, 364 and two-input multipliers 362, 366. One input of each multiplier 362, 366 is coupled to a gain value GradG by which the respective adder output 361, 365 is multiplied. The circuits 312, 314 respectively include two-input adders 370/372 and 374/376. The circuit 316 includes a Max element 380 that outputs 317 the largest of a selected subset (the EstV1, EstV2, EstH1,EstH2 values alone or all eight inputs) of its eight inputs. The circuit 318 includes a Min element 382 that outputs 319 the smallest of a selected subset (the EstV1, EstV2, EstH1,EstH2 values alone or all eight inputs) of its eight inputs. The subset is selected by the GradL input. The circuit 320 includes a limit element 384 that, when the input Ld2Pd2 is outside the bounds defined by the Max and Min inputs 317, 319, limits the output Ld2Pd2' to whichever of the Min or Max values is closer to the input Ld2Pd2. The limit element 384 also has an enable input EN that, when driven by an appropriate signal (here, the logical AND of three signal conditions: GradEN True AND Row>1 AND Col>1), causes the limit element to ignore the Max and Min inputs and therefore output the Ld2Pd2 value no matter its size (these conditions are true only when the Ld2Pd2 pixel is from column 2 or greater and row 2 or greater, which is necessary for all the delay elements storing the pixels 350 to have valid data). Other interconnections between the elements and the signals not described herein are evident from FIG. 9 and the previous descriptions of FIG. 8. Note also that FIG. 9 shows the widths of various signals; these widths merely illustrate values used in one embodiment and can be varied as needed in other situations. The method implemented in the embodiment of FIG. 9 is now described. First, Form the Gradient Signal in Horizontal and Vertical Direction (in Circuits 308, 310):

GradH 311 =GradG * (Ld2Pd3−Ld2Pd1)

GradV 309 =GradG * (Ld3Pd2−Ld1Pd2)

Where GradG is a programmable value, shown in FIG. 9 as GradG[1:0] (the bracket notation indicating that GradG is a two bit field). Values of GradG less than one will cause more pixels to be sensed as bad pixels (smaller acceptable range) and values greater than one will cause fewer pixels to be sensed as bad pixels (larger acceptable range). In one embodiment, the values used for GradG are 1/2, 1, 3/2 and 2; other values are also possible. Additionally, the GradG values used to determine the horizontal and vertical gradients GradH, GradV can be the same or different.

Second, Add (or Subtract) Gradients to Values Two Pixels Away (in Circuits 312, 314):

EstV1=Ld1Pd2+GradV

EstV2=Ld4Pd2−GradV

EstH1=Ld2Pd0+GradH

EstH2=Ld2Pd4−GradH

Third, Determine the Acceptable Range by Finding the Maximum and Minimum Estimate (in Circuits 316, 318):

Max 317=max(EstH1, EstH2, EstV1, EstV2)

Min 319=min(EstH1, EstH2, EstV1, EstV2)

Fourth, Limit the Ld2Pd2 Value to the Range (Min, Max) (in the Circuit 320):

Ld2Pd2'=if (Ld2Pd2>Max)

Max else if (Ld2Pd2<Min)

Min else

Ld2Pd2

Figure 10A:
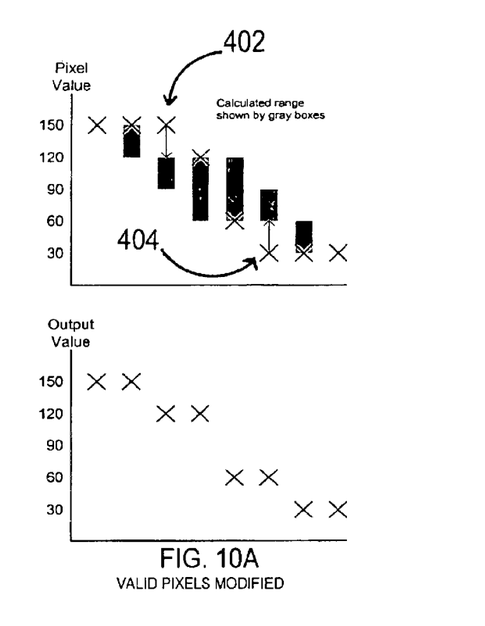
FIG. 10A is a graph showing a situation where an embodiment of the present invention might modify good pixel values.
Figure 10B:
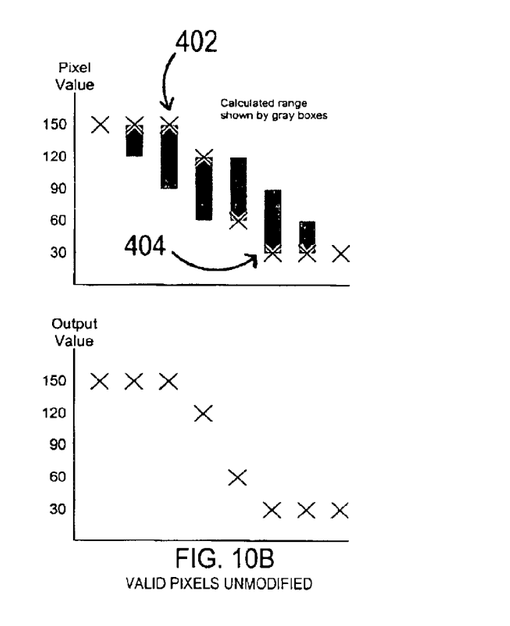
FIG. 10B is a graph showing a situation where an alternative embodiment of the present invention does not modify the pixel values modified in FIG. 10A.

In the embodiment of FIG. 9, there is an option to include additional terms in the Max and Min equations (e.g., by asserting the GradL signal, FIG. 9). The purpose of including additional terms is to reduce the number of pixels falsely determined to be bad pixels. FIG. 10 shows one dimensional examples of a situation in which, using the basic formulation of the Max and Min equations, good pixels are falsely determined to be bad pixels (FIG. 10A) and, using the additional terms, the good pixels are not altered (FIG. 10B). In this situation it is given that the GradV value 309 is zero for all pixels and there are no bad pixels. In the upper portions of FIGS. 10A and 10B the input pixel values are shown as "X" characters and the calculated Min/Max range by shaded boxes. The lower portions of FIGS. 10A and 10B shows the output pixel values after operation of the present invention.

In FIG. 10A, the EstH1 and EstH2 term are calculated using the equations above. With this configuration, at least some of the pixels under test are reduced in value (e.g, the pixels 402, 404), even though they were not bad pixels. FIG. 10B shows the effect of modifying the Min and Max equations as follows:

Max=max(EstH1, EstH2, EstV1, EstV2, Ld2Pd0, Ld2Pd4, Ld0Pd2, Ld4Pd2)

Min =min(EstH1, EstH2, EstV1, EstV2, Ld2Pd0, Ld2Pd4, Ld0Pd2, Ld4Pd2)

The additional terms (e.g., Ld2Pd0, Ld2Pd4, Ld0Pd2, Ld4Pd2) are pixels of the same color as the pixel under test (Ld2Pd2) and serve to insure that the Min and Max range is at least as large as the neighboring pixels of the same color. This prevents the system from incorrectly limiting the allowed pixel value at transitions. In the embodiment of FIG. 9, the additional pixels are selected by asserting the GradL signal. Preventing in this way the incorrect limiting of good pixel values tends to preserve thin lines in the horizontal, vertical or diagonal directions.

Other advantages of the present invention include, but are not limited to:

1) Performing single pixel detection and correction of bad pixels for color image sensors prior to using pixel values in any other calculations (RGB interpolation, edge enhancement, etc.) prevents bad pixels from affecting the values of other pixel locations.

2) Correction of bad pixel without the use of low pass filtering techniques maintains good image detail.

3) The pixel correction method works equally well for color image ('Bayer' pattern) and monochrome sensors.

4) Detection and correction of bad pixels in real time means that special light patterns (such as flat white or black field) need not be applied.

5) Real time detection removes the need for storing bad pixel locations (i.e., detection and correction can be achieved without the need for storing the locations of bad pixels). In the absence of real time detection, bad pixel locations would need to be stored in a non-volatile memory. This could be in the form of a programmable ROM, which would increase system cost. Another method to store bad locations would be, if the camera had the ability to communicate with a computer (as in a video conferencing situation) to use the computer's hard disk. This, however, limits useful applications and requires the user to perform a setup routine in which bad pixels are detected and saved, or requires a file to be shipped with each camera detailing the bad pixel location(s).

Figure 11A:
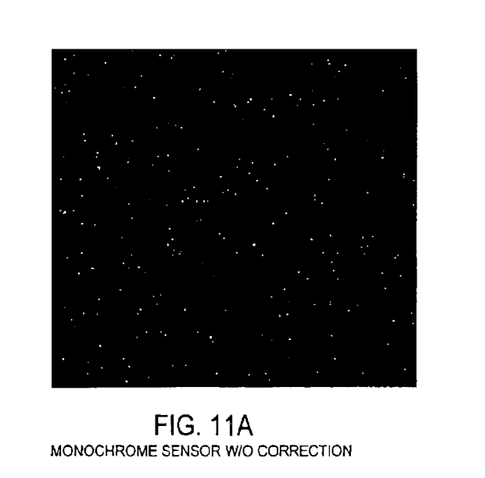
FIG. 11A shows output from a monochrome sensor exposed to a uniform light source without application of bad pixel detection and correction.
Figure 11B:
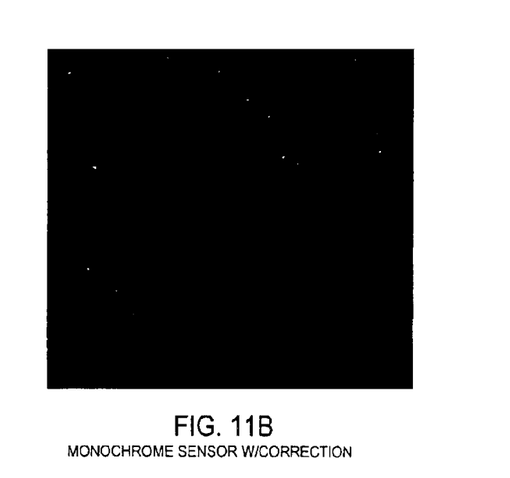
FIG. 11B shows output from a monochrome sensor exposed to a uniform light source with application of bad pixel detection and correction.
Figure 12A:
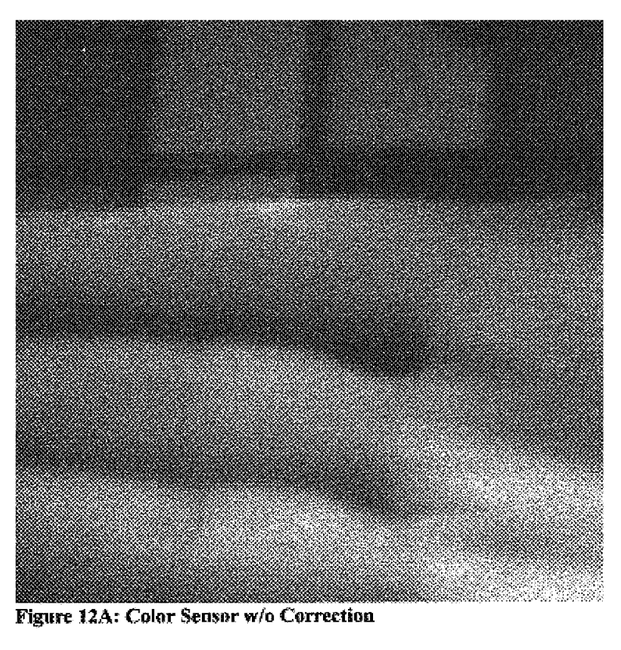
FIG. 12A shows output from a color sensor without application of bad pixel detection and correction.
Figure 12B:
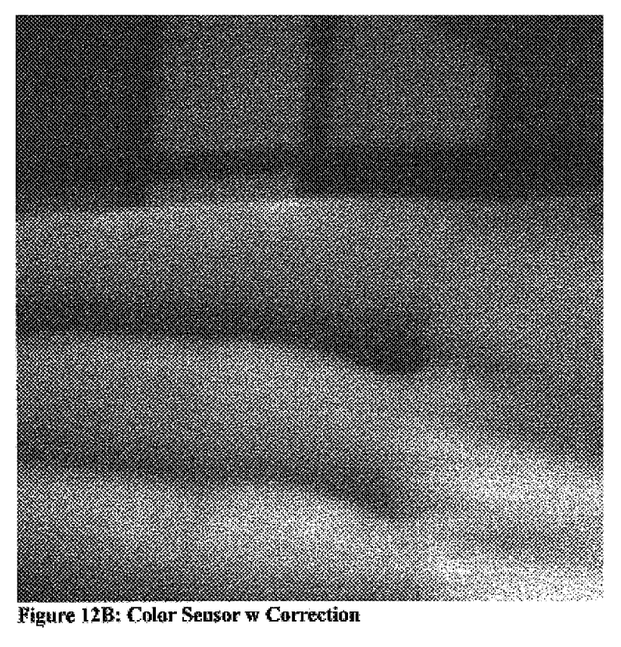
FIG. 12B shows output from a color sensor with application of bad pixel detection and correction.
Figure 12C:
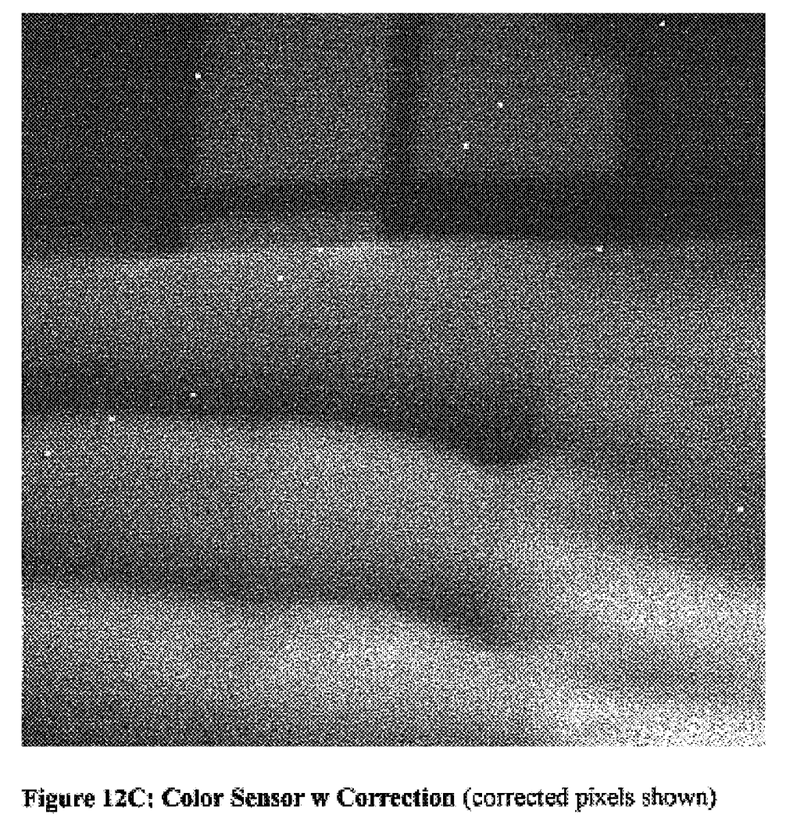
FIG. 12C shows output from a color sensor with application of bad pixel detection and correction (the positions of corrected pixels are shown with yellow and cyan squares).

(6) The correction method has minimal affect on thin lines in the horizontal, vertical or diagonal directions (see FIGS. 10, 11 and 12).

(7) The correction method only affects a pixel's value if the input light source causes a bad pixel location to become visible.

(8) Valid estimates of a given pixel's value can be obtained using the values of a set of pixels that were exposed to different wavelengths of light (i.e., covered with different color filters) than the given pixel.

Actual results illustrating benefits of the present invention are now described with reference to FIGS. 11 and 12.

FIGS. 11 and 12 show the results of applying an embodiment of the present invention to a monochrome and color image sensor (with and without color filters applied). In FIG. 11A, an image sensor with no color filters was exposed to a low uniform light condition, and the raw data from the sensor was captured into a frame memory. A 128×128 subset of this frame of data is shown. This data was then processed by a C program which implemented the bad pixel detection and correction method of the present invention. FIG. 11B shows the results of this method for the same 128×128 subset of data. As the FIGS. show, most bad pixels are correctly detected and corrected. There are two locations on the left hand side of the image in which adjacent pixels were bad. These cases were not corrected.

FIGS. 12A–12C show the output of an image sensor with color filters exposed to a scene of a human hand with a color test chart in the background, under typical office lighting conditions. Again, the raw data was captured in a frame buffer. A C program was then used to process the raw data in accordance with the present invention. In FIG. 12A, RGB interpolation and white balance is performed, but no bad pixel detection and correction is performed. In FIG. 12B, the same RGB interpolation and white balance is performed, and bad pixel detection and correction is also performed. FIG. 12C shows the same processing as FIG. 12B, with the additional steps of setting any pixel whose value is reduced by more than 10 counts by the present invention to yellow and setting any pixel whose value is increased by more than 10 counts by the present invention to cyan. This helps to identify which pixels are determined to be bad pixels. For FIGS. 12A through 12C, the same 128×128 subset of the image was enlarged to 384×384 (to make the defects more visible) and saved.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A bad pixel detection and correction system, comprising:
    a plurality of line memories configured to store a like plurality of lines of digital pixel data values from a photocell array;
    a computing circuit configured to:
        dynamically compute in real time first and second estimates for the value of a given pixel from the values of surrounding pixels, the values of the given pixel and the surrounding pixels comprising pixel data output from the line memories and the photocell array, wherein the first estimate is a dynamically determined minimum value and the second estimate is a dynamically determined maximum value; and
        limit the value of the given pixel to a corrected value within a range defined by the dynamically determined minimum and maximum values;
    the computing circuit comprising;
        gradient circuitry that computes vertical and horizontal gradients of the surrounding pixels immediately above and below and to the left and right of the given pixel;
        estimate circuitry that computes four estimates of the value of the given pixel by respectively adding and subtracting the vertical and horizontal gradients from values of the surrounding pixels of the same color as the given pixel that are above and below and to the left and right of the given pixel;
        min and max circuitry that computes the minimum and the maximum values by respectively determining the smallest and the largest of the four estimates; and
        limiting circuitry that sets the corrected value to the minimum value when the value of the given pixel is less than the minimum value, sets the corrected value to the maximum value when the value of the given pixel is greater than the maximum value, and otherwise sets the corrected value to the given pixel value; and
    a plurality of pixel delay elements configured to store the values of the given pixel and the surrounding pixels.

2. The system of claim 1, wherein the surrounding pixels comprise 8 pixels arranged in a plus (+) configuration centered on the given pixel.

3. The system of claim 1, wherein the pixels of the same color comprise pixels from the surrounding pixels two pixels away from the given pixel.

4. The system of claim 1, wherein the pixel data is selected from:
    monochrome pixel data, or
    color pixel data in a Bayer pattern.

5. A bad pixel detection and correction system, comprising:
    a plurality of line memories configured to store a like plurality of lines of digital pixel data values from a photocell array;
    a computing circuit configured to:
        dynamically compute in real time first and second estimates for the value of a given pixel from the values of surrounding pixels, the values of the given pixel and the surrounding pixels comprising pixel data output from the line memories and the photocell array, wherein the first estimate is a dynamically determined minimum value and the second estimate is a dynamically determined maximum value; and
        limit the value of the given pixel to a corrected value within a range defined by the dynamically determined minimum and maximum values;
    the computing circuit comprising;
        gradient circuitry that computes vertical and horizontal gradients of the surrounding pixels immediately above and below and to the left and right of the given pixel;
        estimate circuitry that computes four estimates of the value of the given pixel by respectively adding and subtracting the vertical and horizontal gradients from values of the surrounding pixels of the same color as the given pixel that are above and below and to the left and right of the given pixel;
        min and max circuitry that computes the minimum and the maximum values by respectively determining the smallest and the largest of the four estimates and the values of the surrounding pixels of the same color as the given pixel; and
        limiting circuitry that sets the corrected value to the minimum value when the value of the given pixel is less than the minimum value, sets the corrected value to the maximum value when the value of the given pixel is greater than the maximum value, and otherwise sets the corrected value to the given pixel value; and a plurality of pixel delay elements configured to store the values of the given pixel and the surrounding pixels.

6. The system of claim 5, wherein the pixels of the same color comprise pixels from the surrounding pixels two pixels away from the given pixel.

7. A bad pixel detection and correction system, comprising:
 a plurality of line memories configured to store a like plurality of lines of digital pixel data values from a photocell array;
 a computing circuit configured to:
  dynamically compute in real time first and second estimates for the value of a given pixel from the values of surrounding pixels, the values of the given pixel and the surrounding pixel comprising pixel data output from the line memories and the photocell array, wherein the first estimate is a dynamically determined minimum value and the second estimate is a dynamically determined maximum vales; and
  limit the value of the given pixel to a corrected value within a range defined by the dynamically determined minimum and maximum values;
 the plurality of line memories comprise four line memories, a first of the line memories being configured to store data newly read out from the photocell array, a second of the line memories being configured to receive and store pixel values output from the first line memory, a third of the line memories being configured to receive and store corrected values from the computing circuit and a fourth of the line memories being configured to receive and store pixel values output from the third line;
 twelve pixel delay elements configured to store values of the given pixel and the surrounding pixels;
 a first five of the pixel delay elements being configured to store pixel values output from respective ones of the line memories and the photocell array;
 a second five of the pixel delay elements being configured to receive pixel values output from respective ones of the first five delay elements; and
 an additional two of the pixel delay elements being serially coupled to receive corrected pixel values from the computing circuit; and
 wherein values of the surrounding pixels and the given pixel used by the computing circuit to generate the corrected pixel value for the given pixel are output in a single clock cycle from the output of the second five of the pixel delay elements, from the output of the additional two of the pixel delay elements, from the output of the second line memory, and from the output of the one of the first five of the pixel delay elements that is coupled to receive the output of the second line memory.

8. The system of claim 7, wherein the computing circuit comprises:
 gradient circuitry that computes vertical and horizontal gradients of the surrounding pixels immediately above and below and to the left and right of the given pixel;
 estimate circuitry that computes four estimates of the value of the given pixel by respectively adding and subtracting the vertical and horizontal gradients from values of the surrounding pixels of the same color as the given pixel that are above and below and to the left and right of the given pixel;
 min and max circuitry that computes the minimum and the maximum values by respectively determining the smallest and the largest of the four estimates; and limiting circuitry that sets the corrected value to the minimum value when the value of the given pixel is less than the minimum value, sets the corrected value to the maximum value when the value of the given pixel is greater than the maximum value and, otherwise, sets the corrected value to the given pixel value.

9. The system of claim 8, wherein the gradient computing circuitry is configured to compute;
 vertical gradient by determining difference of the values of the pixels immediately above and below the given pixel and multiplying that difference by a first gradient gain; and
 horizontal gradient by determining difference of the values of the pixels immediately to the left and right of the given pixel and multiplying that difference by a second gradient gain.

10. The system of claim 7, wherein the computing circuit comprises:
 gradient circuitry that computes vertical and horizontal gradients of the surrounding pixels immediately above and below and to the left and right of the given pixel;
 estimate circuitry that computes four estimates of the value of the given pixel by respectively adding and subtracting the vertical and horizontal gradients from values of the surrounding pixels of the same color as the given pixel that are above and below and to the left and right of the given pixel;
 min and max circuitry that computes the minimum and the maximum values by respectively determining the smallest and the largest of the four estimates and the values of the surrounding pixels of the same color as the given pixel; and
 limiting circuitry that sets the corrected value to the minimum value when the value of the given pixel is less than the minimum value, sets the corrected value to the maximum value when the value of the given pixel is greater than the maximum value and, otherwise, sets the corrected value to the given pixel value.

11. The system of claim 10, wherein the gradient computing circuitry is configured to compute:
 vertical gradient by determining difference of the values of the pixels immediately above and below the given pixel and multiplying that difference by a first gradient gain; and
 horizontal gradient by determining difference of the values of the pixels immediately to the left and right of the given pixel and multiplying that difference by a second gradient gain.

12. A method for detecting and correcting bad pixels, comprising:
 inputting digital pixel values from a photocell array;
 dynamically computing two estimates for the value of a given pixel based on the values of surrounding pixels, wherein one of the two estimates is a dynamically determined minimum value and the other of the two estimates is a dynamically determined maximum value, the dynamically computing including:
  computing a horizontal gradient between values of two nearest pixels to left and right of the given pixel, wherein the left and right pixels are responsive to a first color not necessarily the same as a second color to which the given pixel is responsive;
  computing a vertical gradient between values of two nearest pixels above and below the given pixel, wherein the above and below pixels are responsive to a third color not necessarily the same as the second color;

computing four estimates of the value of the given pixel by respectively adding and subtracting the vertical and horizontal gradients from values of the surrounding pixels of the same color responsiveness as the given pixel, which surrounding pixels are above and below and to the left and right of the given pixel;

computing minimum and maximum values by respectively determining the smallest and the largest of the four estimates and the values of the surrounding pixels of the same color as the given pixel; and setting the corrected value to:
the minimum value when the value of the given pixel is less than the minimum value,
the maximum value when the value of the given pixel is greater than the maximum value, and
the given pixel value, otherwise; and limiting the value of the given pixel to a corrected value within a range defined by the dynamically determined minimum and maximum values.

13. The system of claim 12, wherein the surrounding pixels comprise 8 pixels arranged in a plus (+) configuration centered on the given pixel.

14. The method of claim 12, wherein the pixels of the same color comprise pixels from the surrounding pixels two pixels away from the given pixel.

15. The method of claim 14, wherein the pixel data is selected from:
monochrome pixel data, or
color pixel date in a Bayer pattern.

16. The method of claim 12, further comprising:
performing inputting, computing and limiting steps in real time as pixel values are output from the photocell array.

17. A method for detecting and correcting bad pixels, comprising:

inputting digital pixel values from a photocell array;

dynamically computing two estimates for the value of a given pixel based on the values of surrounding pixels, wherein one of the two estimates is a dynamically determined minimum value and the other of the two estimates is a dynamically determined maximum value, the dynamically computing including:

computing a horizontal gradient between values of two nearest pixels to left and right of the given pixel, wherein the left and right pixels are responsive to a first color not necessarily the same as a second color to which the given pixel is responsive:

computing a vertical gradient between values of two nearest pixels above and below the given pixel, wherein the above and below pixels are responsive to a third color not necessarily the same as the second color;

computing four estimates of the value of the given pixel by respectively adding and subtracting the vertical and horizontal gradients from values of the surrounding pixels of the same color responsiveness as the given pixel that are above and below and to the left and right of the given pixel;

computing minimum and maximum values by respectively determining the smallest and the largest of the four estimates; and setting the corrected value to:
the minimum value when the value of the given pixel is less than the minimum value,
the maximum value when the value of the given pixel is greater than the maximum value, and
setting the corrected value to the given pixel value, otherwise; and limiting the value of the given pixel to a corrected value within a range defined by the dynamically determined minimum and maximum values.

18. The method of claim 17, wherein the pixels of the same color comprise pixels from the surrounding pixels that are two pixels away from the given pixel.

* * * * *